Figure 1:
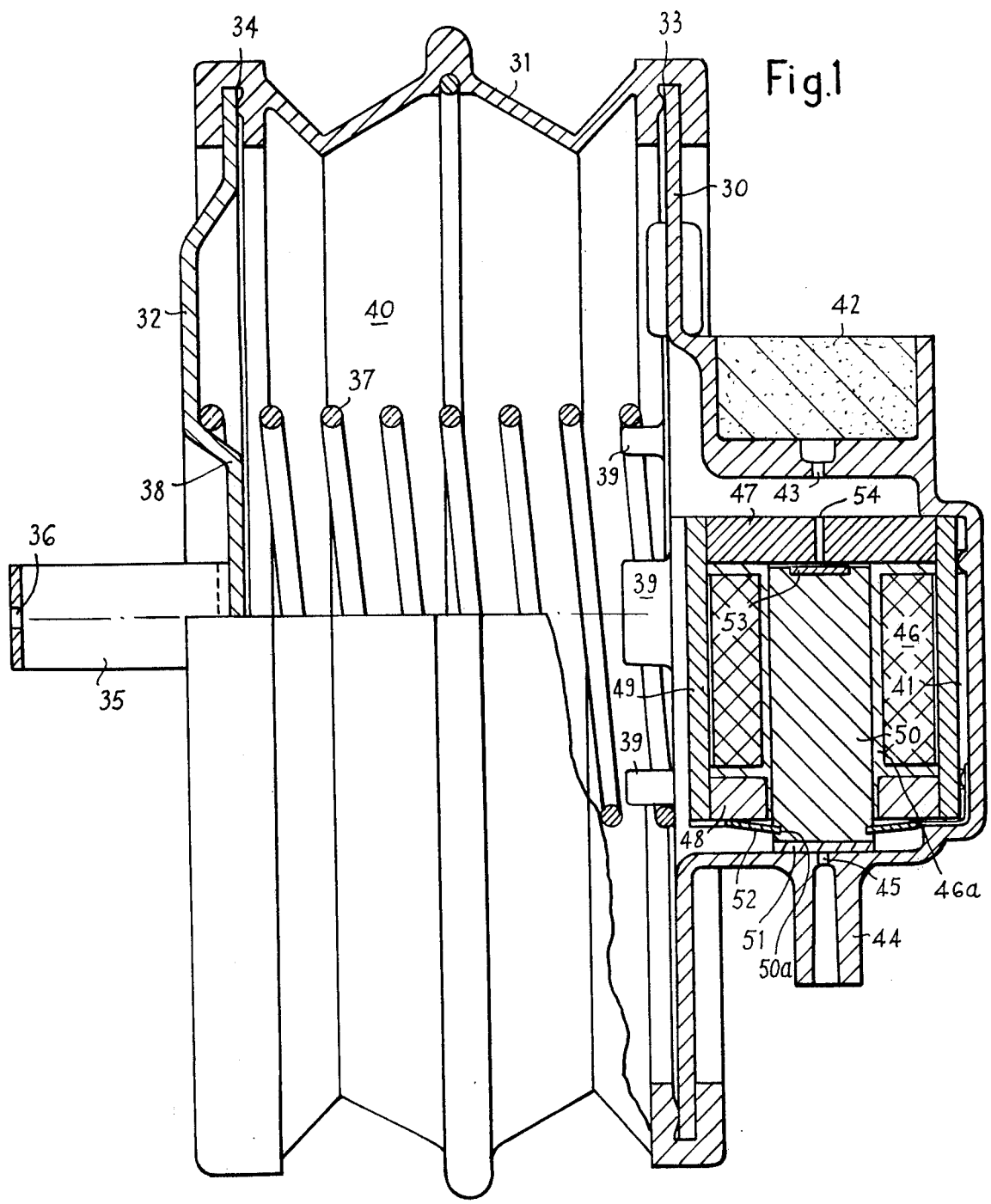

United States Patent [19]

Noddings et al.

[11] 4,010,674

[45] Mar. 8, 1977

[54] SPEED RESPONSIVE SYSTEMS

[75] Inventors: John Noddings; Norman Hunt, both of Leamington Spa, England

[73] Assignee: Associated Engineering Limited, England

[22] Filed: July 31, 1975

[21] Appl. No.: 600,629

Related U.S. Application Data

[62] Division of Ser. No. 540,540, Jan. 13, 1975, Pat. No. 3,983,954.

[30] Foreign Application Priority Data

Jan. 17, 1974  United Kingdom ............... 2156/74
Mar. 4, 1974  United Kingdom ............... 9699/74

[52] U.S. Cl. .................................. 91/47; 91/459; 92/40
[51] Int. Cl.² ..................... F15B 13/044; F16J 3/04
[58] Field of Search ............... 91/47, 459; 92/40

[56] References Cited

UNITED STATES PATENTS

| 1,070,740 | 8/1913 | Sabroe .................................. 91/47 |
| 3,073,345 | 1/1963 | Hagler .................................. 91/47 |
| 3,502,000 | 3/1970 | Voges et al. ........................ 91/47 |
| 3,584,650 | 6/1971 | Macaulay ............................. 91/47 |

*Primary Examiner*—Paul E. Maslousky
*Attorney, Agent, or Firm*—Brisebois & Kruger

[57] ABSTRACT

An actuator device includes a chamber partly bounded by a movable wall and connected to atmosphere through a permanently open orifice and an electromagnetic valve which is maintained in a closed position when de-energized and which controls the connection to said chamber of a volume of gas at other than atmospheric pressure when said valve is open.

6 Claims, 5 Drawing Figures

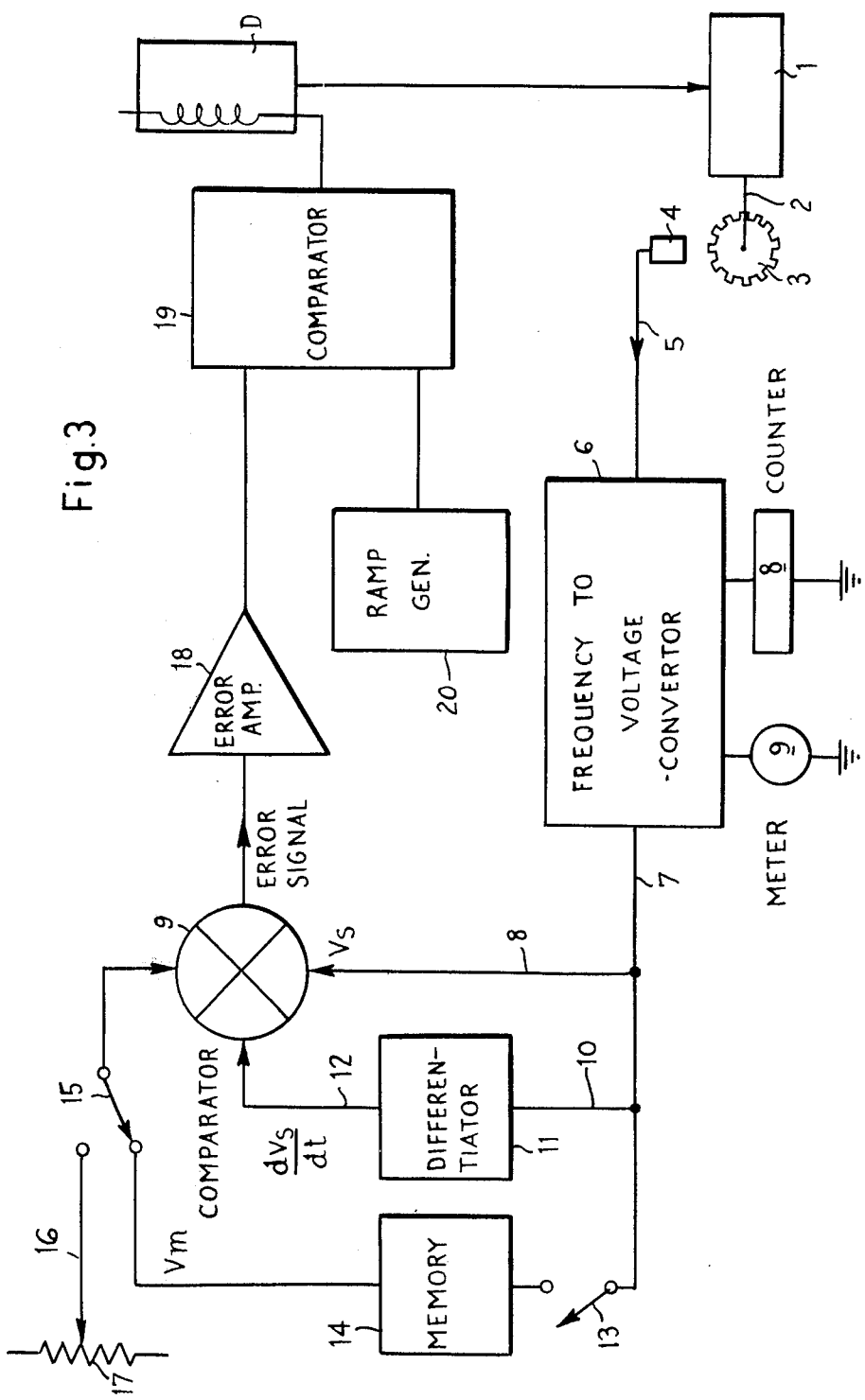

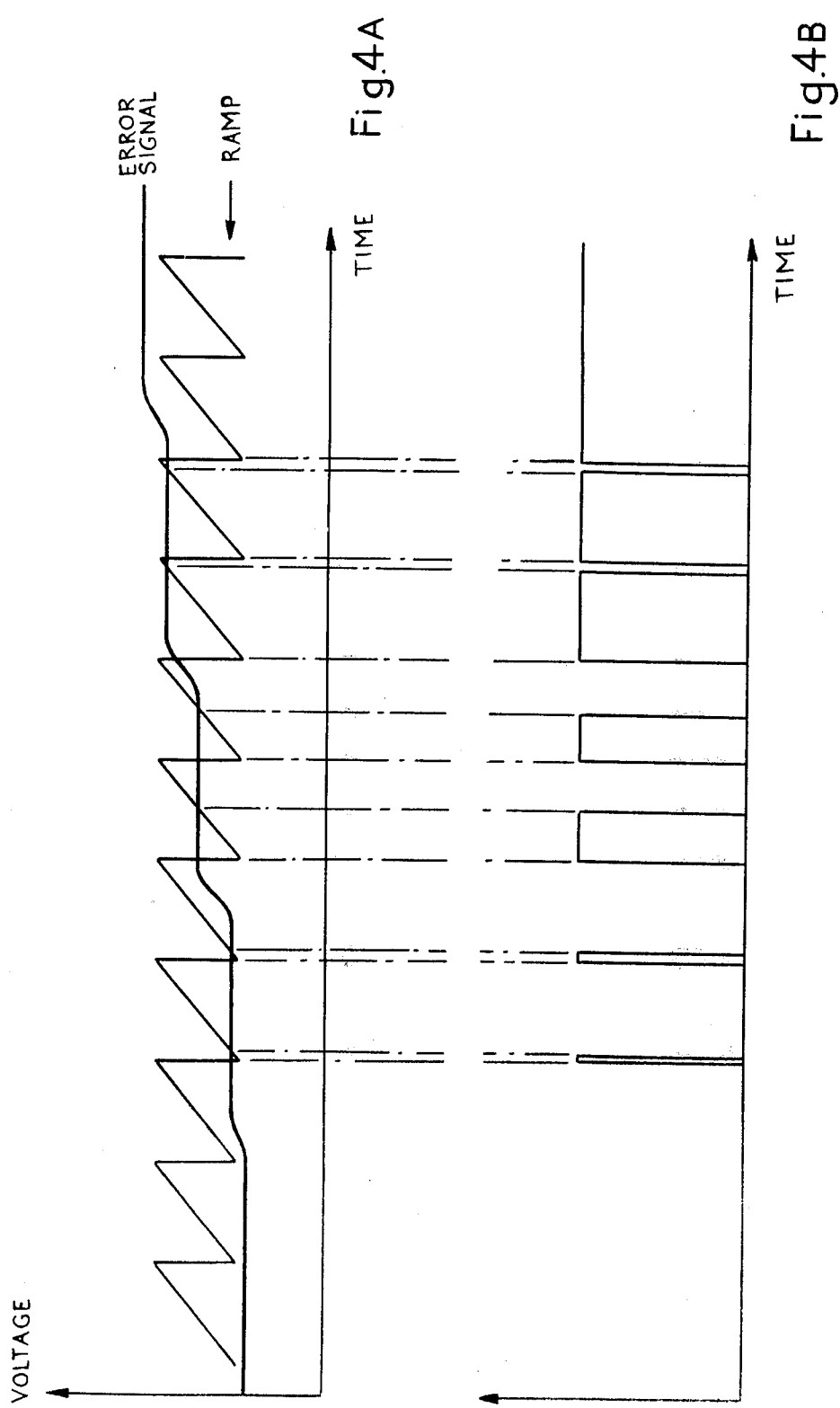

SPEED RESPONSIVE SYSTEMS

This is a division, of application Ser. No. 540,540, filed Jan. 13, 1975, now U.S. Pat. No. 3,983,954.

The present invention relates to speed-responsive systems and particularly to speed-responsive systems for motor vehicles, whereby the vehicle may be maintained at a predetermined speed.

This invention also relates to actuator devices.

From one aspect the invention provides a speed-responsive system, comprising means for generating a first voltage which changes with the rotational speed of a rotatable member, and a second voltage which is dependent on the rate of change of the first voltage, means for generating a reference voltage, first comparator means for combining the first and second voltages with the reference voltage, said first comparator means being arranged to change its output signal dependent upon the relative magnitude of said first voltage, said second voltage and said reference voltage, and said output signal being fed to second comparator means for comparison with a periodic voltage of constant frequency so as to produce at the output of said second comparator means a train of pulses of constant frequency and of a width varying with the relative magnitude of said first voltage, said second voltage, and said reference voltage.

The invention also provides an actuator device comprising a chamber partly bounded by a moveable wall and connected to atmosphere through a permanently open orifice and an electromagnetic valve which is maintained in a closed position when de-energised and which controls the connection to said chamber of a volume of gas at other than atmospheric pressure, when said valve is open.

The volume of gas is conveniently a partial vacuum source, such as the air inlet manifold or duct of an internal combustion engine. Alternatively the volume of gas may be above atmospheric pressure.

The invention will now be further described, by way of example, with reference to the accompanying drawings in which:-

Figure 2:
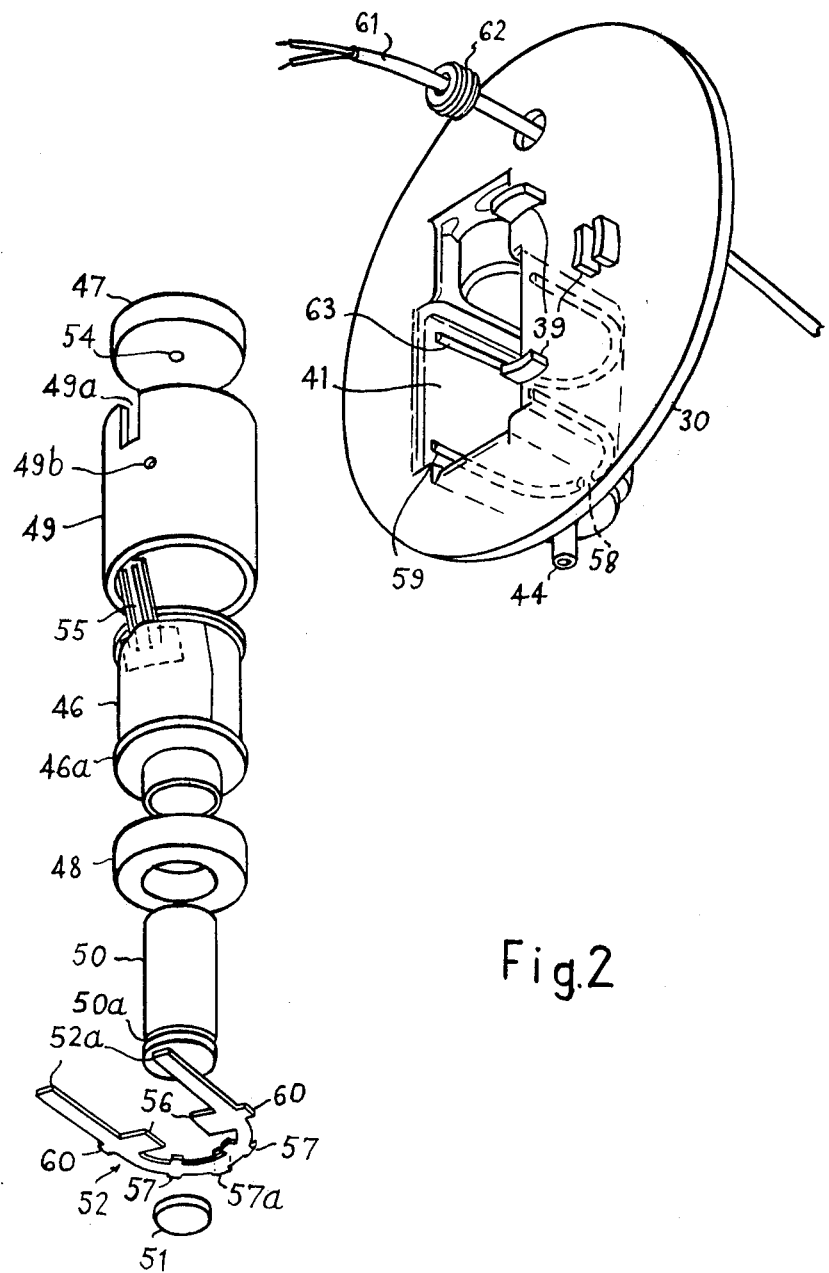

FIG. 1 is a view, partly in section, of one embodiment of an actuator device suitable for use with a speed responsive system according to the invention, FIG. 2 is an exploded view of part of the actuator assembly, FIG. 3 is a block circuit diagram of an electronic speed responsive system, FIG. 4A is a plot of voltage against time for the ramp andd error signals generated in the circuit of FIG. 3, and FIG. 4B shows the pulses of variable mark/space ratio as derived from FIG. 4A and as applied to the electromagnetic valve of the actuator of FIGS. 1 and 2.

The actuator device illustrated in FIGS. 1 and 2 inlcudes a die-cast light alloy body 30 joined by corrugated bellows 31 to a pressed steel movable wall member 32. The bellows 31 have circumferential grooves 33, 34 in which the peripheral edges of the body 30 and wall member 32 are respectively engaged and sealed, thereby defining a cylindrical chamber 40. A bracket 35 is attached to the wall member 32 and has a hole 36 for fastening one end of a cable, chain, rod, or other linkage for controlling the position of, for example, a throttle valve in the inlet manifold of an internal combustion engine, as will hereinafter be described.

The body 30 and wall member 32 are urged apart by a pre-compressed helical spring 37, which is located within the chamber by an inward protrusion 38 of the member 32 and by a plurality of lugs 39 integral with the body 30.

A chamber 41 formed in the body 30 is provided at one end with an air filter 42, e.g. of open cell foam plastics material. Air can pass from atmosphere into the actuator chamber 40 through the filter 42, a restrictor orifice 43 and chamber 41.

The other end of chamber 41 has a tube connection 44 whereby the actuator may be connected to a partial vacuum source, such as the air inlet manifold of an engine. The connection 44 communicates with the actuator chamber 40 through a restrictor orifice 45.

An electromagnetic valve held in position within the chamber 41 includes a solenoid winding 46 which, when energised by an electrical signal, generates a magnetic field in the solenoid magnetic circuit comprising soft iron end plates 47, 48, a tubular body 49 and a moveable cylindrical armature 50. The armature 50 has one end face covered with a pad 51 of sealing and cushioning material and is biased by a spring device 52 to urge the pad 51 against the orifice 45. The spring device 52 is generally U-shaped and has portions which engage in a groove 50a adjacent one end of the armature. The spring device 52 also serves to locate the electromagnet assembly in position in the chamber 41 as will be more fully described later with reference to FIG. 2.

When the winding 46 is energised, the aramture 50 is drawn into the magnetic circuit until a further cushioning pad 53, let into a depression at the other end of the armature 50, bears against the end plate 47. In this state the pad 51 is withdrawn from the orifice 45 and the interior chamber 40 of the actuator is thereby connected to the source of partial vacuum so that due to the flexibility of the bellows 11 the movable wall member 32 is drawn towards the body 30 against the force of the spring 37.

The armature 50 is a close fit in the former 46a of winding 46, so an orifice 54 is provided as a vent in the end plate 47 to allow for movement of air. The size of the orifice may be selected to provide some damping of the motion of the armature 50 if required. Alternatively, instead of providing the end plate 47 with an orifice, sufficient clearance is allowed around the armature 50 to permit venting of the air.

As shown in FIG. 2, the solenoid body 49 has an axially extending slot 49a at one end and a radial aperture 49b at approximately its mid-position. The body 49 receives the solenoid winding 46 on its nylon former 46a. The ends of the winding 46 are attached to a substantially T-shaped printed circuit connector 55. When the winding on its former is received in the body 49 the connector 55 fits into the axially extending slot 49a. At one end the bobbin 46a is retained by the end plate 47 and at the other end by the annular end plate 48. If desired, the plates may be crimped to the body portion 49 to lock them in position. The cylindrical armature 50 is slidably received within the bobbin and has the resilient pads 51 and 53 bonded onto opposite ends thereof. The U-shaped spring clip and locating device 52 is pressed from a sheet of resilient material, such as copper beryllium, and is substantially planar. As may be seen in detail in FIG. 2 the locating device includes a pair of inwardly directed projections 56 one on each arm of the 'U', which are received in the armature groove 50a at diametrically opposite positions when the actuator is assembled. Two locating tags 57 project downwardly out of the plane of the device and are arranged to engage around the cylindrical wall of the body 49. A third tag 57a is longer than the tags 57 and projects downwardly out of the plane of the locating device and is arranged to engage in the gap 58 between the ends of spaced ribs 59 on the wall of the chamber 41 and to abut the surface of the wall.

The outsides of the arms of the 'U' also include a pair of abutments 60 which serve to position the spring locating device 52 with respect to the width of the chamber 41 and guide the device into the chamber.

To assembly the actuator, the solenoid winding 46 on its bobbin 46a is placed in the body portion 49 with the printed circuit connector 55 projecting through the axially extending slot 49a. The end plates 47, 48 are then placed and crimped in position. The projections 56 are inserted in the armature groove 50a and the armature is inserted into the solenoid 46, 46a. The tags 57 engage over the top edge of body portion 49 with the arms 52a of the 'U' spring projecting either side of the peripheral groove 50a in the armature. The solenoid assembly is then ready for insertion into the chamber 41. This is achieved by inserting the assembly into the chamber with the spring locating device 52 arranged between the ribs 59 and the bottom of the chamber 41, the tag 57a being disposed in the space 58 between the ribs. The arms 52a project beyond the level of the surface of die-casting 30 and serve as a visual check on the accuracy of the assembly. The rib 63 on the wall of chamber 41 also assists in locating the assembly.

The completed assembly may then be crimped in place in the chamber 41 by downwardly deforming a shoulder on the end wall of the chamber adjacent the ribs 59 thus trapping the periphery of the spring locating device 52 between an end face of the chamber 41 and an end face of the body 49.

An electrical lead 61 for supplying electrical signals to the solenoid is soldered to the connector 55, the lead extending through a grommet 62 in the diecasting 30 for connection to an appropriate electrical supply, e.g. a supply of energising pulses as will hereinafter be described.

The spring locating device 52 normally spring loads the pad 51 of armature 50 against the orifice 45 so that no air can enter or leave the chamber 40 through the connection 44. The actuator is therefore a fail-safe device. However, when the solenoid winding 46 is energised, the armature 50 is retracted into the solenoid and the orifice 45 is opened so that the interior of the chamber 40 of the actuator may be connected to a source of partial vacuum such as the inlet manifold of a vehicle to which the device is fitted.

It will be seen that the spring locating device 52 serves both to spring load the armature to close orifice 45 and to locate the armature within the chamber in the diecasting and also provides a simple method for actuator assembly.

If desired the chamber 40 may be constructed with a rigid side wall, instead of the bellows 31, and the moveable wall member 32 may form a piston sliding within the chamber.

Referring now to FIG. 3 there is shown a block circuit diagram of an embodiment of an electronic speed responsive system according to the invention. A vehicle power unit 1 includes the usual engine and gearbox and drives an output shaft 2 to which is fastened a ferrous-toothed disc or wheel 3. Adjacent the toothed wheel is an inductive transducer 4 of the kind which emits an electrical pulse as each tooth on the wheel 3 passes the transducer. Alternatively, suitable pulses may be obtained from the contact breaker of the engine ignition system. Each pulse passes along a line 5 to a frequency-to-signal converter circuit 6 which emits an electrical feedback signal V which is proportional to pulse frequency, along a line 7. A pulse counter 8 is also fed with the pulses and can be calibrated either in terms of numbers of rotations of the vehicle output shaft 2, or in terms of distance travelled. A meter 9 is connected to be fed by the signal V and is calibrated in terms of rotational speed of the output shaft or in terms of the vehicle speed. The signal V in line 7 is fed by a line 8 as one input $V_s$ to a comparator 9. The signal V is also fed by a line 10 to a differentiator 11 whose output signal $dV_s/dt$ is proportional to the rate of change of signal V and is fed by a line 12 as a further input to the comparator 9.

In addition, the signal V is fed through a set-memory switch 13 to an electrical memory circuit 14 which may either be an analogue or a digital memory. The circuit 14 maintains an output signal which is equal to the value of the signal V whenever the switch 13 is momentarily closed. The output signal of memory circuit 14 is fed as a third input signal $V_m$ into the comparator 9 through a switch 15. Alternatively $V_m$ can be derived, for example, from the slide 16 of a potentiometer 17 connected across the supply voltage and fed to the comparator 9 through the switch 15 in its other position. The voltage from slider 16 represents a desired preset speed.

The comparator 9 processes the three signals which are fed to it and produces an error signal which is fed to an error amplifier 18, the output of which is connected to one input terminal of a further comparator 19. A ramp generator 20, generating a ramp pluse frequency of between 10 to 50 Hz, typically 20 Hz, is connected to the other input terminal of the comparator 19.

The operation of the comparator 19 will be described with reference to FIGS. 4A and 4B. As can be seen, the comparator compares the ramp and error signals (FIG. 4A) so as to produce an output in the form of a plurality of substantially constant frequency pulses, whose mark/space ration varies in dependence upon the magnitude of the error signal (FIG. 4B). Thus when the magnitude of the error voltage is less than that of the lower extremities of the ramp voltage, then no pulses are provided as may be seen from the left side of FIGS. 4A and 4B. When the error voltage lies within the amplitude of the ramp waveform, pulses of variable mark/space ratio are produced as may be seen from the central section of FIGS. 4A and 4B. When the error voltage lies above the peak amplitude of the ramp waveform, then pulses of infinite mark/space ration are produced, as seen from the right side of FIGS. 4A and 4B.

The output of the comparator 19 is fed to the solenoid winding 46 of the electromagnetic valve of the actuator device D, such as is described with reference to FIGS. 1 and 2, and which enables the system described to control the vehicle power unit 1 so as to maintain a vehicle at a predetermined desired speed.

In use, a vehicle driver takes his vehicle up to speed, for example 50 m.p.h., which he wishes to maintain constant. He then operates a control to open switch 13 and thereby sets and stores the desired constant speed in the memory 14. This switching also causes the comparator 19 to emit pulses to the electromagnetic valve. At this time, the signal Vm from memory 14 is equal to the feedback signal Vs applied to the comparator 9, so that the error signal fed to comparator 19 through the error amplifier 18 is set at a position corresponding with the mid-position of the amplitude excursion of the ramp signal. Accordingly the mark/space ratio of the output pulses from comparator 19 is unity. These pulses of unit mark/space ratio cause the electromagnetic valve of the actuator to move up and down so as to allow pulses of reduced gas pressure from the air inlet manifold of the vehicle engine to enter the chamber 40 defined by the actuator bellows and move the actuator to a position which will hold the engine throttle of the vehicle at some opening. Although the electromagnetic valve responds to the individual electrical pulses, the actuator only responds to the integrated change in gas pressure within the chamber 40 which is caused by these pulses. If this throttle opening is insufficient to maintain the desired speed, the vehicle speed will drop thereby causing the error signal fed to comparator 19 to change to a value or level which is such as to give a wider pulse width, which in turn will control the actuator to move the engine throttle to an opening which will maintain the desired speed. Similarly, if the engine throttle opening is too high to maintain the desired speed, the system will cause the error signal to change in value or level so as to produce smaller pulse widths from comparator 19 which in turn will control the actuator so as to move the engine throttle to a smaller opening.

If, the vehicle speed changes from 50 m.p.h., for example due to a gradient, an unbalanced error signal is again produced. If for example the vehicle is going down an incline and the speed rises beyond 50 m.p.h., the error signal will change in value or level to give smaller pulse widths until in the limit it is less than the ramp signal, so that no pulses are fed to the electromagnetic valve thus closing the orifice 45 to reinflate the bellows 31 and hence to partly close the throttle (left hand side of FIGS. 4A and 4B). This reduces the quantity of fuel available to the engine so that the vehicle speed falls to 50 m.p.h.

Similarly, if for example the vehicle is travelling up an incline and the speed falls below 50 m.p.h., the error signal will change in value or level to give greater pulse widths until at the limit it is greater than the ramp signal thus producing pulses of infinite mark/space ratio so that the orifice 45 is fully opened to deflate the bellows 31 against the spring 37, the hence increase the quantity of fuel available to the engine so that the vehicle speed rises to 50 m.p.h. (right hand side of FIGS. 4A and 4B). Between the two above limits, pulses of variable mark/space ratio are produced when the error signal lies between the amplitudes of excursion of the ramp signal as may be seen from the central section of FIGS. 4A and 4B.

One of the advantages of the above system is that when the actuator is not in use, the orifice 45 leading to the inlet manifold of the vehicle engine is blocked by the pad 51 of armature 50 shutting of the airflow to the inlet manifold. Hence the normal exhaust emission characteristics of the engine are not interfered with by the system when not in use.

If desired, a top speed inhibit may be built in to the system by restricting the value to which the memory signal from circuit 14 may rise. It will be appreciated that since the maximum speed is built into the electronic system it is not adjustable by the driver.

When the driver wishes to render the system inoperative, he may, for example, depress a switch on the vehicle facia to disengage the device or alternatively a micro-switch may be fitted to the footbrake which automatically disengages the device when the footbrake is depressed.

We claim:
1. An actuator device comprising:
    a chamber having a relatively fixed wall and a relatively movable wall interconnected by a bellows,
    a spring within said chamber to urge said bellows to an extended position,
    a permanently open orifce through which said chamber is connected to atmosphere,
    a cavity provided in said relatively fixed wall outside of said bellows,
    an electromagnetic valve housed in said cavity and including a solenoid winding surrounding an armature movable in a direction transverse to the direction of movement of said bellows,
    an aperture in said cavity which is closed by one end of the armature of said electromagnetic valve when said solenoid winding is de-energised, and which is opened by retraction of said armature from said aperture when said solenoid winding is energised to enable the connection to said chamber of a volume of gas at subatmospheric pressure to cause said bellows to contract against the force of said spring, and resilient means acting on the other end of said armature for urging said armature to close said aperture when said solenoid is de-energised.
2. An actuator device as claimed in claim 1, wherein said resilient means is a spring member which also serves to locate the electromagnetic valve in position in said cavity and said spring member is generally U-shaped and includes portions which engage with and bias said armature to its closed position and further portions which engage with the wall of said cavity to locate the electromagnetic valve in position.
3. An actuator device as claimed in claim 2, wherein the wall of said cavity is provided with ribs or the like which co-operate with said spring member to locate said electromagnetic valve in position.
4. An actuator device as claimed in Claim 3, wherein said spring mmember is crimped between said ribs and a wall of said cavity to hold said valve in position in said cavity.
5. An actuator device as claimed in Claim 2, wherein a wall of said cavity also includes said permanently open orifice communicating with said chamber and a filter member for filtering atmospheric air passing through said orifice to said chamber.
6. An actuator device as claimed in Claim 2, wherein said spring member portions which engage with said armature comprise a pair of projections extending inwardly of the U, while said further portions which engage with the wall of the cavity comprise tag members extending outwardly of the U.

* * * * *